United States Patent

Goble

[15] 3,707,601

[45] Dec. 26, 1972

[54] FACSIMILE TRANSCEIVER

[72] Inventor: Ralph W. Goble, Boulder, Colo.

[73] Assignee: Phonocopy, Inc., Wilmington, Del.

[22] Filed: July 24, 1970

[21] Appl. No.: 58,053

[52] U.S. Cl. ................................178/7.6, 346/139 A

[51] Int. Cl. ................................................H04n 3/04

[58] Field of Search .........178/7.6; 346/139 A; 179/6

[56] References Cited

UNITED STATES PATENTS

| | | | |
|---|---|---|---|
| 3,527,882 | 9/1970 | Brouwer et al. | 178/6 X |
| 3,064,077 | 11/1962 | Cary | 178/7.6 X |
| 3,541,245 | 11/1970 | Wilby | 178/6 X |

*Primary Examiner*—Robert L. Griffin
*Assistant Examiner*—Richard K. Eckert, Jr.
*Attorney*—Chittick, Pfund, Birch, Samuels & Gauthier

[57] ABSTRACT

A flat-bed scanner for facsimile transceivers permits an original document to be inserted for scan reading and the sheet materials necessary for scan print-out to be operatively engaged respectively by the scanning read heads or writing stylii by mounting these scanning elements on an endless belt driven on two spaced pulleys. The original document is read by the read heads as they move in one direction between the pulleys and the print-out occurs on the opposite side of the pulley assembly as the writing stylii are transported by the belt on its return run. By establishing "-diametric symmetry" simplified phase synchronization of two units is obtained independent of the direction of transmission.

10 Claims, 6 Drawing Figures

INVENTOR
RALPH W. GOBLE.
BY Chittick, Pfund,
Birch, Samuels & Gauthier
ATTORNEYS INVENTOR
RALPH W. GOBLE
BY Chittick, Pfund, Birch, Samuels & Gauthier
ATTORNEYS

FACSIMILE TRANSCEIVER

BACKGROUND OF THE INVENTION

The field of this invention is facsimile transceivers and more particularly devices of this type which are readily adapted for both transmission and reception of facsimile copies of documents. One form of device to which the present invention is particularly directed is the so-called flat-bed type printer in which the document to be transmitted and the copy sheet on which the facsimile image is formed are both fed through the device by a flat sheet transport system with the scanning occuring by scanning devices which move in essentially a linear path as they traverse the scanned surface. One such device is shown in the U.S. Pat. to Salaman et al., No. 3,502,814.

Prior art facsimile transceivers generally require manipulation of the document and the print paper when the device is changed from a transmitting mode to a receiving mode. For example, in drum-type scanners the document to be transmitted or the paper on which the received message is to be printed are fitted on the surface of the drum and as the drum rotates a lead screw advances some form of scanning device along the length of the drum and in scanning contact with the surface of the sheet carried by the drum. Similarly the Salaman et al. patent previously referenced requires the feeding of the different sheets past the scanning heads at a single location thus requiring the introduction of the document or print sheet materials as a separate step whenever the device is used.

Devices of this type which require a change of configuration depending upon whether they are to be used for transmission or reception also generally require a recognition of this change in mode of operation in the generation and utilization of the synchronizing signal which is passed between two such units coupled together as transmitter and receiver. Thus in the drum-type scanners the scan head must be positioned at the start of the traverse at both units prior to the initiation of the scanning operation. With the scan heads so positioned the synchronizing signal is utilized to start both the write scanning traverse and the read scanning traverse at the respective units at the same time. In the flat bed scanners it is also necessary to identify or precondition the scan heads as to transmission and reception for the purpose of synchronization since the generation of a synchronizing signal at a definite point in the cycle for a given machine will not be directly usable for synchronization irrespective of the direction of transmission without the introduction of some phasing step which assures that a transmitting scan starts at the transmitter at exactly the same time that a receiving scan starts at the receiver. Generally, this involves preconditioning the starting point for the scanning element or the introduction of some phasing step in the dynamic operation which recognizes that the start synchronizing signal generated at the transmitter must be used with respect to a receive scan generated signal at the receiver.

SUMMARY

The present invention provides improved features for a facsimile transceiver both as to the handling of the sheet materials which comprise the document to be transmitted and the image receiving sheet for the facsimile copy and the arrangement for developing synchronization between two such machines. In particular, by employing configurations which exhibit diametric symmetry and separate support surfaces for the transmitted document and the received image sheet a simplified synchronization can be effected between similar coupled units. By virtue of the separate paper support and scan provisions it is possible to feed the sheet materials for transmission and reception in a simplified manner and where desired maintain the print-out materials which may be specialized for the type of printing employed in continuous supply so that no manual feeding of the print-out sheet is required. These advantages are achieved from arrangements which permit the read and write heads to scan in unison over separate portions of the scan path and with sheet support surfaces associated with these separate portions. Where this motion is circular the geometry and the motion are symmetrical through the diameter of rotation and hence the term "diametric symmetry" is used to describe these features. It will be clear from the disclosure, however, that the concept is not limited to circular geometry or even to rotating motion but can be employed wherever the foregoing description of scan motion and sheet support structure for the reading and writing operation cooperate to make reading-writing synchronization automatic.

DESCRIPTION OF THE PREFERRED EMBODIMENT

Figure 1:
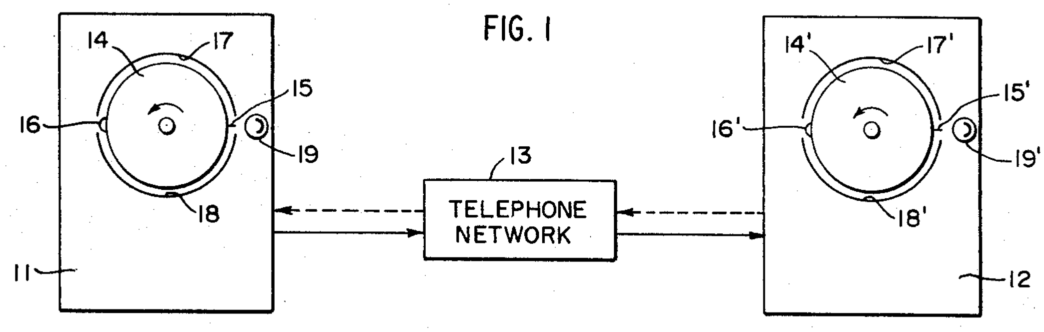
FIG. 1 is a representation of two identical transceivers coupled to operate as a system exhibiting diametric symmetry.

The description of the preferred embodiment will begin by first describing in general the configuration for scanning with diametric symmetry as respects transmission and reception. In FIG. 1, two generalized identical scanning transceivers 11 and 12 are shown interconnected for transmission in either direction via the telephone network 13. The transceiver 11 has a rotating scanning mechanism 14 which carries a writing stylus 15 and a read head 16. The path traced by the read and write elements 15 and 16 as the scan mechanism 14 rotates traverses opposed support surfaces 17 and 18 which are designed to cooperate with the write head 15 and the read head 16 respectively. Thus when the scan mechanism 14 rotates, the writing element 15 can be adapted to write on an image receiving sheet supported on the surface 17 and when it is desired to scan the document for transmission which is supported on the surface 18 the read head 16 senses the information thereon and develops a scan transmission signal. The position of the scanning elements 15 and 16 on the path which they trace is referenced to an index point which may be a mark or line suitably detected and as shown in FIG. 1 a photocell 19 is provided for detecting an index point on the surface of the scanning mechanism 14.

The other transceiver 12 has identical parts identified by the corresponding primed numerals to those described for the unit 11. As can be seen the synchronizing detectors 19 and 19′ are adapted to produce synchronizing signals when the rotary scan mechanism 14 and 14′ are in the same relative position. This condition of synchronization is established by means of the signals developed by detectors 19 and 19′ irrespective of the direction of transmission. Thus to transmit a document from unit 11 and produce a facsimile copy at unit 12 the document is supported on support 18 and a print-out sheet is supported on surface 17′. With the units synchronized in the position shown in FIG. 1 the scan of the read head 16 over the document supported on the surface 18 starts in phase with the traverse of the writing element 15′ as it scans the print-out sheet supported on the surface 17′. Similarly for transmission of a document from the unit 12 to produce a facsimile copy of the unit 11 the document supported on the surface 18′ is scanned by the read head 16′ in time phase with the scan of the write head 15 over the pring-out sheet supported on the surface 17. Thus time synchronization of the signals developed by the detectors 19 and 19′ assures proper phasing between a reading head at one transceiver and a writing head at the other transceiver irrespective of the direction in which transmission occurs. Without the concept of diametric symmetry and the opposed supports for the document and print-out sheet it would, of course, be required to rephase the rotating scanning mechanism 14 or 14′ through 180° as the direction of transmission between the two units 11 and 12 changed. It will also be noted that the same functional result could be obtained if the rotary and stationary parts were interchanged, i.e., if the support surfaces 17 and 18 were on the surface of the rotating drum 14 and the read and write elements 15 and 16 were stationary and diametrically opposed. Other configurations in which the parts maintain their same relative relation can also be envisaged.

Figure 2:
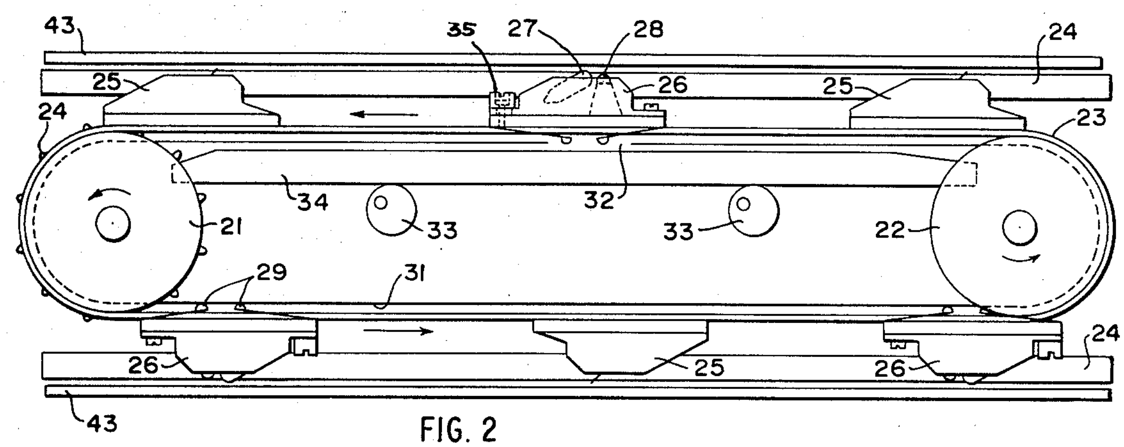
FIG. 2 is a front elevation of a pulley belt scan assembly with the front portion of the guide track for the scan heads removed for clarity.

The preferred form of scan mechanism utilizing the concept of diametric symmetry is shown in FIG. 2 to comprise a pair of spaced pulleys 21 and 22 between which is tensioned a continuous fiberglass belt 23 which to minimize slippage may contain sprocket holes for the sprocket teeth 24 on the drive pulley 21. Pulley 22 is an idler and the distance between the rotative axes of the pulleys 21 and 22 is adjustable for threading and tensioning the belt 23. On the belt 23 are mounted three write heads 25 and three read heads 26 each connected to the belt 23 at a single point to permit pivoting of the head as the belt 23 goes around the circumference of the pulleys 21 and 22. The belt and pulley assembly rotates with respect to spaced parallel guide tracks 24 for the heads 25, 26, the forward one of which is removed for clarity of illustration in FIG. 2. Opposed to the read and write heads 25, 26, as they move in opposite directions on the top and bottom runs of the belt 23 are the read and write sheet support surface members 43.

The three writing heads 25 are equidistantly spaced on the belt 23 and as shown in fIG. 2 the spacing of the pulleys and the diameters thereof are such that a write head 25 starts its traverse from right to left as soon as the preceding write head 25 has finished its traverse. This provides maximum resolution for a uniform speed of feeding the sheet on which the facsimile image is written as it moves transverse to the path followed by the scanning heads 25. The same spacing characteristics apply for the read heads 26 and as indicated on the lower run of the tape 23 in FIG. 2 a read head 26 starts at the right hand edge of the run as soon as the preceding read head 26 is finished at the left hand end of the run. The read heads 26 comprise a lamp 27 and an aperture photocell optical system 28 for illuminating and scanning a document to develop a scan signal. For energizing these components and deriving a signal a set of sliding contacts 29 is provided riding on tracks 31. As indicated in FIG. 2 the track 31 has a break or gap 32 which may be used to derive a synchronizing signal from the circuit of the photocell system 28 by virtue of the momentary interruption of the energization of the lamp 27 due to the gap 32 in the slip ring assembly 31. Obviously any other form of deriving an index signal on the path travelled by the heads 25 and 26 could also be employed.

Figure 5:
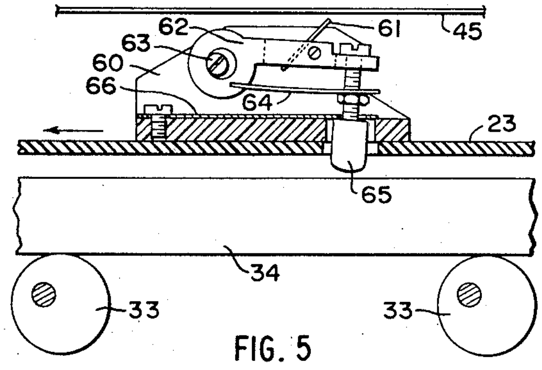
FIGS. 5 and 6 are enlarged representations of the write head structure and elevating mechanism for erecting the writing stylus to be in contact with the print-out foil.
Figure 6:
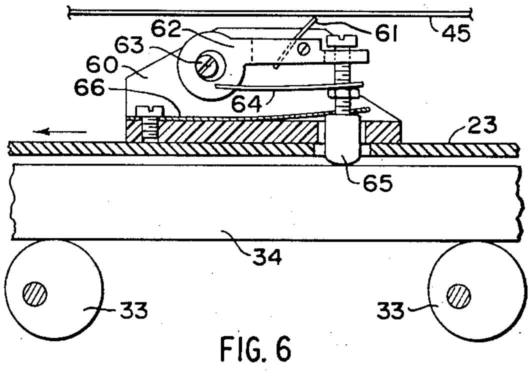

The writing heads 25 which will be hereinafter described in detail with respect to FIGS. 5 and 6 are conditioned to be operative by a set of cams 33 which can be rotated to elevate a print bar 34. When the print bar 34 is elevated the writing stylus is erected into a sheet contacting position and when the print bar 34 is lowered as shown in FIG. 2 the stylus is retracted to the a non-sheet contacting position. Thus the writing sheet materials can remain in position at all times since their presence does not interfere with the operation of the machine during transmission when the writing heads 25 are not in use.

The reading heads 26 have the elements 27 and 28 mounted in a housing which is slidable relative to the belt 33 upon turning an eccentric sleeve 35 through which a mounting screw passes. This minute adjustment permits the exact spacing between the read heads 26 to be made equal thereby bringing the scan signals derived from successive read heads 26 into vertical alignment relative to a vertical image appearing on the document being scanned. This minor adjustment permits the precision of a single scan head in a repetitive fixed track to be achieved even though a plurality of scan heads are employed to successively scan the document.

Figure 3:
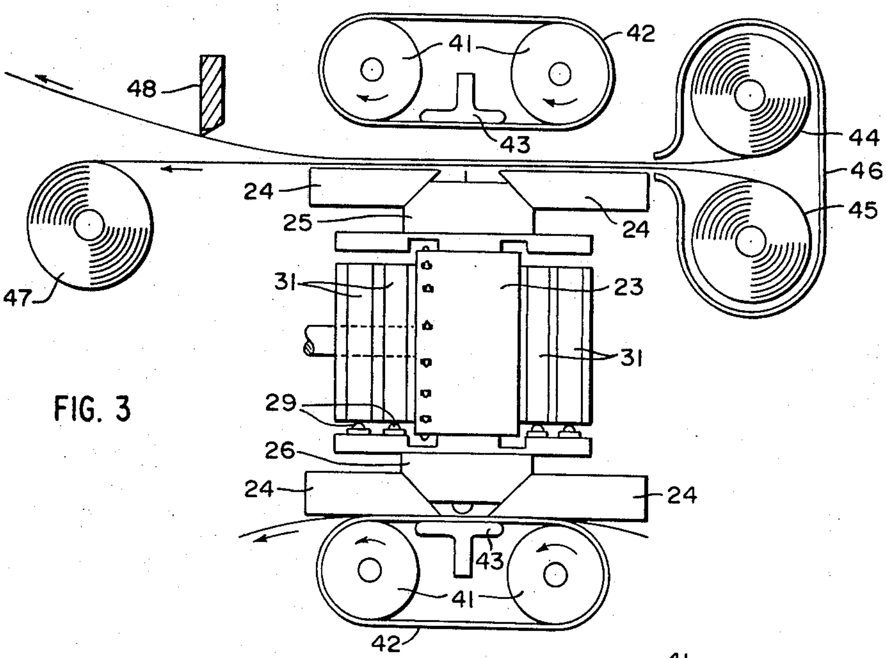
FIG. 3 is an end view of the scan assembly with the sheet drive and support mechanisms shown together with the paper and foil supply rolls for the embodiment of the invention shown in FIG. 2.

In FIG. 3 further details of the scan mechanism shown in FIG. 2 are shown. The guides 24 are seen to comprise a V-shaped slot into which the scan heads 25 and 26 ride as they are advanced on the belt 23. The outer surfaces of the guides 24 provide a flat bed against which the sheet material travel when driven by a sheet transport assembly comprising rollers 41 and a continuous longitudinal endless belt 42 thereon. Inside the endless belts 42 are support surfaces 43 which extend longitudinally the full width of the scan lines traversed by the heads 25 and 26 as they travel on the belt 23. As shown in fIG. 3 the lower support surface 43 is in position where the belt 42 engages the lower surface of the guides 24 thereby forming a driving nip for an original document 40 as it passes through the lower sheet transport assembly to be read by the read heads 26. In the upper portion of FIG. 3 the drive assembly comprising rollers 41 and belt 42 with support surface 43 is elevated to its non-driving position. When lowered, as hereinafter explained, to contact sheet materials on the upper surfaces of the guide bars 24, a driving nip is formed to advance the print-out materials.

The print-out materials comprise in the preferred embodiment a roll of ordinary paper 44 and a roll of thin metallic foil such as aluminum, stainless steel or nickel all mounted in a cassett housing 46. The rolls of sheet materials 44 and 45 are fed across the upper surface of the guide bars 24 with the paper on top and the foil underneath in a position to be contacted by the stylus in the write heads 25 when erect. The foil from the roll 45 is accumulated after use on a take-up roll 47 while the paper is adapted to exit the mechanism past a tear-off cutting edge 48. The drive belts 42 are driven at a speed which is coordinated with the speed of rotation of the pulleys 21 and 22 to provide the desired vertical spacing between the horizontal lines traced out by the repetitive scan of the scan heads 25 and 26.

Figure 4:
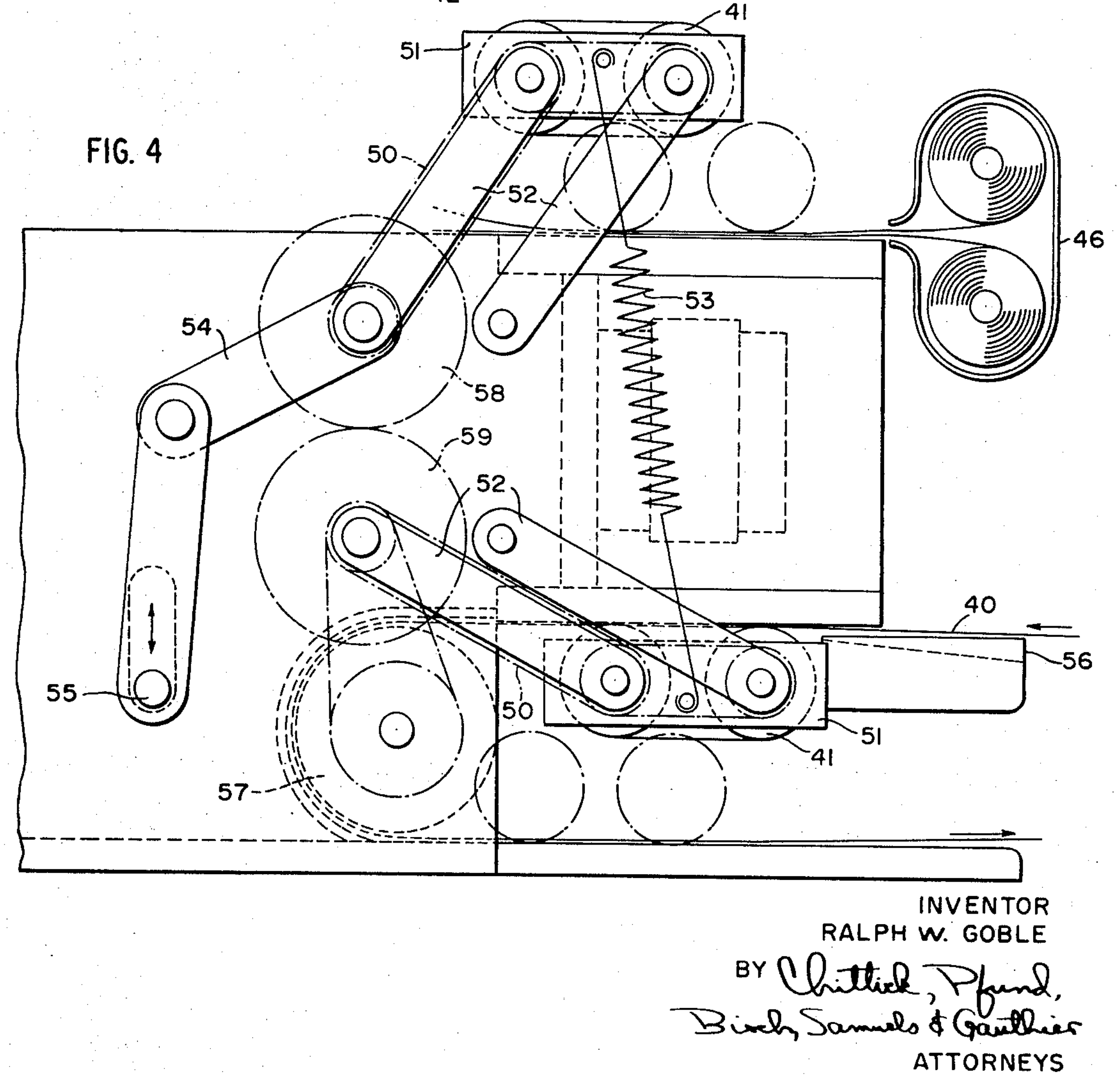
FIG. 4 is an end elevation of the invention corresponding to FIG. 3 with the sheet drive mechanism elevating linkage shown.

Referring now to FIG. 4 the end elevation view of the roll elevating mechanism for the paper transport shown in FIG. 3 is illustrated. The rolls 41 are rotatably mounted in end chocks 51 which are supported by parallel linkages 52 and driven by a belt drive 50 from meshing drive gears 58, 59. The chocks 51 are interconnected by a spring 53 and the top parallel linkage 52 has a bell crank extension 54 coupled to a vertically sliding actuator 55. The actuator 55 is operated up or down in conjunction with the rotation of the print cam rolls 33 and as shown in FIG. 4 elevates the upper set of chocks 51 to hold the transport assembly at the top of FIG. 3 out of contact with the sheet materials 44 and 45. In this position the spring 53 elevates the lower chock assembly 51 into contact with the lower set of guides 24 to provide the driving nip for the original document 40.

As indicated in FIG. 4 a sheet guide 56 is provided into which an original document can be fed to the nip formed by the lower roller and belt assembly to be fed in operative position for scanning by the scan heads 26. Upon emerging from the nip a turn-around roll 57 belt driven from gear 59 drives the document 40 out of the machine below the input slot guide 56. When the print cam rolls 33 are rotated to elevate the print cam bar 34 (FIG. 2) the vertical actuator 55 is elevated causing the bell crank 54 to lower the upper linkage 52 into driving contact with the foil and paper fed from within the cassett 46. When so lowered the spring 53 permits the lower drive assembly to drop away from driving engagement with the surfaces of the guide blocks 24.

FIGS. 5 and 6 show respectively the details of a retracted and erected stylus 61 in the write heads 25. In FIG. 5 the print bar 34 is lowered and stylus 61 is retracted with the cams 33 shown in the same position as in FIG. 2. The stylus 61 is carried near the end of a conductive arm 62 which is pivoted on a horizontal eccentric 63 supported on the dielectric body 60 of the write head 25. Also extending from the eccentric hub 63 and integral thereby with the conductive arm 62 is a leaf spring 64 on the end of which a relatively heavy sliding contact 65 is mounted. A leaf spring 66 is fixed to the body 60 by screw 67 and urges the contact 65 downward. When the print bar 34 is raised by rotation of cams 34 it elevates the contact 65 which through the leaf spring 64 rotates and urges the arm 62 into an elevated position as shown in FIG. 6 thereby erecting the stylus 61 to project far enough to be in operative contact with the metal foil 45. By means of the eccentric pivot 63 the exact spacing between successive read heads 25 on the belt 23 can be accurately adjusted to achieve vertical alignment of the print-out produced by the successive separate heads 25 as they scan the foil to produce the facsimile copy of the original document.

For reference to details in the prior art pertaining to transceivers of the type herein disclosed reference is made to U.S. Pat. No. 3,502,814 and the patents cited therein. While a specific embodiment of the improvements provided by the present invention has been disclosed it will be appreciated that various modifications can be made without departing from the true scope of the invention as defined in the appended claims.

I claim:

1. A facsimile transceiver comprising: reading device means for producing electric scan signals representing the image on a document; writing device means for producing scan images on a sheet in response to electric scan signals; opposed support surfaces for a document to be read and a sheet to have an image written thereon by said device means respectively; rotating drive means for traversing said device means over said surfaces in a closed path which is subdivided into diametrically opposite sectors each substantially equal to the length of a scan line and substantially coextensive with said opposed support surfaces; means for indexing said drive means at a predetermined position on said closed path; means selectively operable for alternately bringing said opposed support surfaces into operative position relative to said reading device means and said writing device means; said support surfaces associated with drive means for respectively moving said documents and said sheet transverse to said closed path when in said operative position; said writing device means including a stylus, and including means for erecting said stylus into sheet contacting position when said support surface for said sheet is in said operative position and retracting said stylus when said support surface for said document is in said operative position; a substantial reserve supply of continuous sheet stock for supplying said sheet, and means for feeding said sheet stock to be maintained between said stylus and said support surface for said sheet and brought into engagement with said stylus when said support surface for said sheet moves to said operative position; said supply of sheet stock comprising a roll of thin metal foil and a roll of paper fed as a two-ply sheet with said support surface for said sheet when in said operative position bearing against said paper to urge said foil into contact with said stylus.

2. A facsimile transceiver comprising;

a pair of spaced rotatable pulleys, the axis of rotation for said pulleys being parallel;

a belt connecting said pulleys to rotate in unison therewith and provide linear parallel opposite direction top and bottom transport runs between said pulleys;

means for driving the pulley and belt assembly; an equal plurality of separate read and write heads carried on said belt with equidistant alternate spacing along said belt;

planar support surfaces opposed to said top and bottom transport runs;

means including said read heads operative for reading a document supported on one of said support surfaces; and means including said write heads for producing a facsimile copy on a sheet supported on the other of said support surfaces; said support surfaces associated with flexible web drive means operative when engaged for driving flexible web material transverse to said transport runs; and means selectively operable to bring said flexible web drive means alternately into operative engagement at one or the other of said support surfaces as the transceiver is conditioned to either send or receive.

3. Apparatus according to claim 2 in which the length of said transport runs, the length of said support surfaces, the spacing between said read heads on said belt and the spacing between said write heads on said belt are all substantially equal and correspond approximately to the width of the flexible web material engaged by said drive means.

4. Apparatus according to claim 3 in which the spacing and diameter of said pulleys is such that a read head is positioned to start along one of said transport runs whenever a write head starts along the other said transport run.

5. Apparatus according to claim 4 and including means on each of said heads for adjusting the effective position of said head on said belt thereby to precisely obtain said equidistant spacing.

6. Apparatus according to claim 4 and including means for obtaining an electrical synchronizing signal corresponding to a predetermined point on the rotation of said pulley and belt assembly.

7. Apparatus according to claim 2 and including means for obtaining an electrical synchronizing signal corresponding to a predetermined point on the rotation of said pulley and belt assembly.

8. Apparatus according to claim 2 in which said write heads have a stylus which can be erected and retracted and including means for erecting the stylii on said write heads when the transceiver is conditioned to receive and maintaining said stylii retracting when conditioned to transmit.

9. Apparatus according to claim 8 in which said stylii are erected only during the one of said transport runs opposed to said other support surface.

10. Apparatus according to claim 9 and including a roll of paper and a roll of metal foil supported to be fed as a two-ply continuous sheet by said drive means associated with said other support surface with said foil contacted by said erect stylii.

* * * * *